(No Model.) 2 Sheets—Sheet 1.
S. H. RALSTON & J. R. JONES.
METHOD OF AND APPARATUS FOR MANUFACTURING METALLIC CAR WHEELS.
No. 430,750. Patented June 24, 1890.
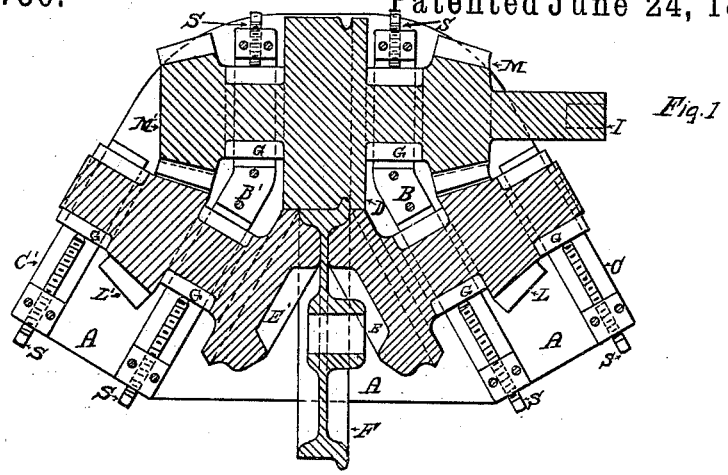
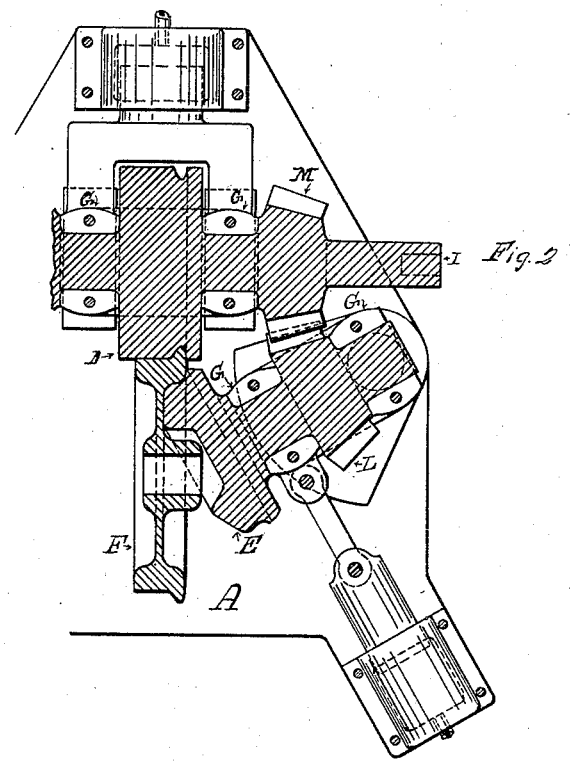
Witnesses.
Inventors.
Samuel H. Ralston
John R. Jones
By Sam'l P. Hanson
Attorney.

(No Model.) 2 Sheets—Sheet 2.
S. H. RALSTON & J. R. JONES.
METHOD OF AND APPARATUS FOR MANUFACTURING METALLIC CAR WHEELS.
No. 430,750. Patented June 24, 1890.
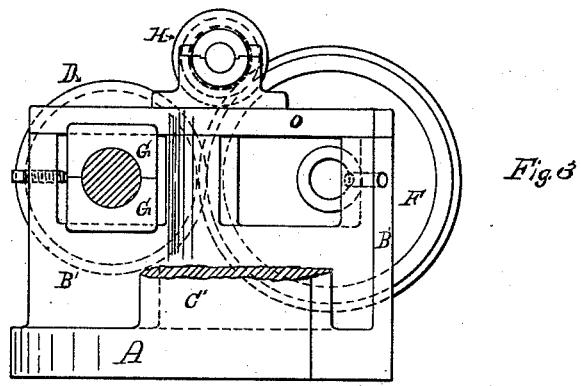
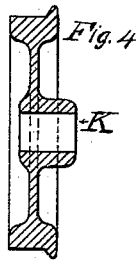
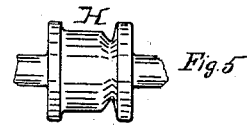

UNITED STATES PATENT OFFICE.

SAMUEL H. RALSTON, OF NORRISTOWN, AND JOHN R. JONES, OF PHILADELPHIA, PENNSYLVANIA.

METHOD OF AND APPARATUS FOR MANUFACTURING METALLIC CAR-WHEELS.

SPECIFICATION forming part of Letters Patent No. 430,750, dated June 24, 1890.

Application filed November 29, 1889. Serial No. 331,973. (No model.)

*To all whom it may concern:*

Be it known that we, SAMUEL H. RALSTON and JOHN R. JONES, citizens of the United States, residing, respectively, at Norristown, Montgomery county, and State of Pennsylvania, and at Philadelphia, in the county of Philadelphia and State aforesaid, have invented a new and useful Improvement in the Method of and Apparatus for the Manufacture of Metallic Car-Wheels, of which the following is a specification.

Our invention relates to the manufacture of metallic car-wheels; and it consists in producing a car-wheel having a web and rim of uniform section and texture, well balanced, and securing in the tread of the wheel, which is the part subjected to the greatest wear and strain, a metal, condensed and fibrous, of great durability and tensile strength, forming a car-wheel having its web and tread composed of fibers of metal disposed in concentric layers or rings around its center. This object we accomplish by compressing the metal of the ingot or bloom from the center toward the periphery of the ingot, and by rolling down the face or tread thereof by means of movable rolls. One pair of these movable rolls operate on both sides of the web and give shape thereto, and are made to close in on the metal, in the process of rolling, by hydraulic power or other mechanism until having forced the metal to flow outward toward the tread the web has been reduced to the desired thickness, whereupon the inward movement of these driven side rolls may be stopped, and being held firmly in place they will act as revolving clamps, hold the metal, and revolve it in position, while a driven tread-roll, which has been moving inward and acting on the periphery of the ingot, continues to move inward and further rolls down, compresses, and condenses the metal of the face thereof and forms the tread and flange of the wheel, and thus completes the operation. By means of this last-named movable tread-roll operating on the tread and flange of the wheel, which is supported only by the side rolls acting as revolving clamps, it may be rolled to any desired diameter, and distortion of the wheel is prevented. The tread and flange and the web of the wheel may be rolled into shape either simultaneously or separately, as may be desired, all the rolls which perform the operation being separately movable.

In the accompanying drawings, Figure 1 represents a sectional plan of the entire machine and a finished wheel in place between the rolls just after rolling. Fig. 2 shows a portion of the sectional plan, representing modifications of the mechanism, showing the position of the rolls E and D and the ingot F at the beginning of the operation, the side roll E being hinged at the point N. Fig. 3 represents a side elevation of the machine, showing the bed-plate, side housing broken off, the main housing, the tread-roll, the wheel, and the friction and steadying roll. Fig. 4 shows a section of the casting of the wheel-ingot before being rolled, and Fig. 5 is a view of the movable friction and steadying roll H.

Like letters designate like parts in the various figures.

A represents the bed-plate.

B and C are the main and side housings, respectively.

D is a view of the tread-roll, whose face is of greater width than the tread and flange of the finished wheel on the driving-shaft, which is movable by means of the screws S or by hydraulic pressure, and having grooves on its face of the requisite form operates so as to give size and shape to the tread and flange or rim of the wheel and also to compress and extend the wheel to any desired diameter. This tread-roll is of greater diameter than the side rolls, in order that the proper elongation of the tread and flange may be secured. A similar result may be produced by a smaller driven tread-roll, so geared that its face will travel faster than the side rolls; but we prefer the larger tread-roll.

E and E' are two rolls upon movable bearings, having heads of such shape as will compress the metal of the ingot outward from the center toward the periphery and produce the desired form of the web of the wheel which is being rolled between them, and by means whereof the web of the ingot is reduced to the proper thickness. So soon as the requisite thickness of the web is secured these rolls continue to revolve, carrying the wheel around with them, and act as clamps, supporting the metal and holding it in place by pressing against the web and the inside of the rim, until the wheel is finished, through the operation of the tread-roll D on the tread and flange. These side rolls E and E' are upon bearings, and may be given a movement in right lines, as shown in Fig. 1; or they may be hinged, as shown in Fig. 2, as may be deemed desirable.

F, Fig. 1, is a view of the finished wheel between the rolls E E' and D at the completion of the operation.

G G are the roll-boxes.

H is a friction-roll, adjustable so as not to interfere with the increase in diameter of the wheel, whose primary object is to rest upon and clasp the tread and flange of the ingot and prevent the formation of pins thereon, and, secondly, to act as a means to prevent vertical movement and consequent distortion of the wheel during the process of rolling. While this roll is used for convenience, we do not consider it as an essential part of our invention, and make no claim for it.

I is the shaft through which power is applied, which may also be applied by other mechanism.

M and M' are pinions or gear-wheels upon the shaft I, whereby power is transmitted to the side rolls E and E' through the pinions or gear-wheels Q and Q', which are on the shafts of the said side rolls, so that the revolution of the tread-roll D upon the shaft I causes a corresponding operation in the said side rolls.

K, Fig. 4, is a section of the casting of a wheel ingot or bloom before rolling.

To operate the machine the side rolls E and E' are drawn or swung back, thus receding from each other, being guided by the flanges of the roll-boxes G G, Fig. 1, (or by the trunnions N, as in Fig. 2,) moving upon the housings B and C. These housings diverge from one another, and the withdrawing of the side rolls E and E' permits the ingot to be inserted between the rolls, which are in gear through the pinions M and M' and Q and Q'. The mill is then started and the side rolls E and E' are gradually forced or driven upon the web and inside of the rim of the wheel, and the tread-roll D is gradually forced or driven upon the rim or tread and flange of the wheel until the desired reduction and formation have been accomplished. These rolls operate as if that portion of the web and tread which is held firmly and revolved between them and on which they are driven were an endless bar. As this portion is reduced in thickness by the rolls as they approach one another toward a common center in the tread, it becomes elongated and is drawn outward and expanded from the hubs, thus increasing the diameter.

We claim as our invention—

1. The process of rolling a car-wheel from an ingot or bloom of a smaller to a larger diameter by means of the co-operation of a positively-driven tread-roll and two positively-driven side rolls, which revolve the ingot, support it, reduce it, form it, and approach one another gradually in right lines toward a common center in the tread, substantially as set forth.

2. In a mill for rolling car-wheels having a driven tread-roll D and two driven side rolls E and E', the said tread-roll having grooves on its face to receive the tread and flange, the combination of the driven tread-roll D with its driving-shaft and pinions, the two driven side rolls E and E' with their shafts and pinions, and the sliding bearings on which the said tread-roll and side rolls approach one another in right lines to a common center in the tread, substantially as set forth.

3. In a mill for rolling car-wheels having a driven tread-roll and two driven side rolls, the combination of the driven tread-roll D, whose face travels at greater speed than the side rolls with its shaft and pinions, the two driven side rolls E and E' with their shafts and pinions, and the sliding bearings on which said tread-roll and side rolls approach one another, substantially as set forth.

SAMUEL H. RALSTON.
JOHN R. JONES.

Witnesses:
G. MORGAN ELDRIDGE,
GEORGE HOUSE.